April 17, 1934. D. J. DOLAN 1,955,056
INTERNAL COMBUSTION ENGINE
Filed Jan. 10, 1931 2 Sheets-Sheet 1
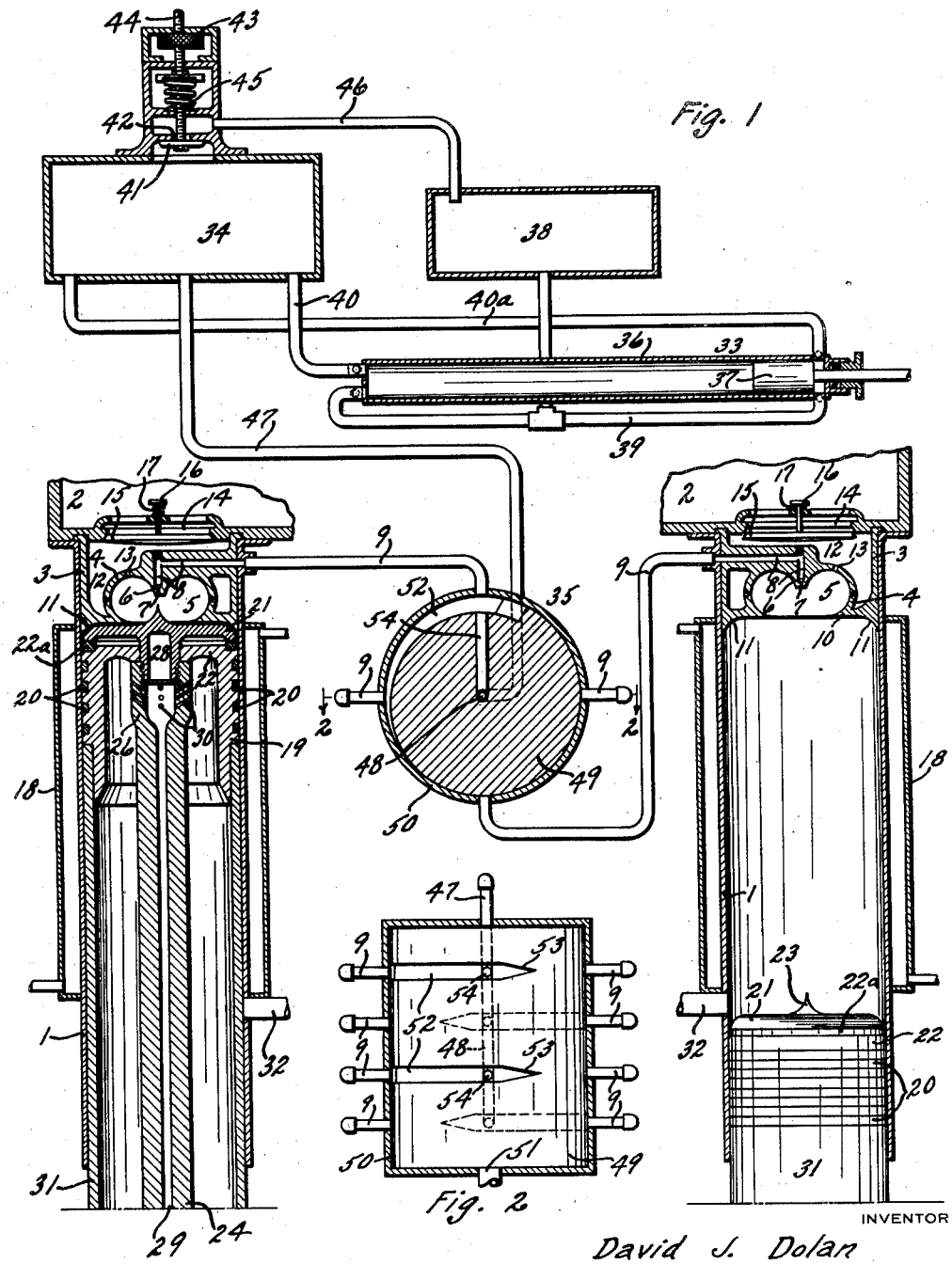
INVENTOR
David J. Dolan
BY
Brockett, Hyde, Higley & Meyer
ATTORNEYS April 17, 1934. D. J. DOLAN 1,955,056
INTERNAL COMBUSTION ENGINE
Filed Jan. 10, 1931 2 Sheets-Sheet 2

INVENTOR
David J. Dolan
BY
Brockett, Hyde, Higley & Meyer
ATTORNEYS

Patented Apr. 17, 1934

1,955,056

UNITED STATES PATENT OFFICE 1,955,056

INTERNAL COMBUSTION ENGINE

David J. Dolan, Cleveland Heights, Ohio

Application January 10, 1931, Serial No. 507,779

1 Claim. (Cl. 123—32)

This invention relates to internal combustion engines of the liquid fuel injection type and more particularly to those for operation upon the two-stroke cycle.

An object of the invention is to provide a pre-combustion chamber communicating with the combustion chamber of the engine through openings; and to arrange the air inlet to said pre-combustion chamber and fuel injection into said combustion chamber; whereby not only fuel, but air as well will be supplied to the combustion chamber during the combustion part of the cycle.

A further object of the invention is to provide a combustion chamber in the form of a ring, with the piston head co-operative with the cylinder head to this end, and to arrange the injection nozzle centrally of the combustion chamber.

Another object is to so arrange the parts that a concentric swirling motion will be imparted to the contents of the combustion chamber as the piston approaches the head end of its stroke.

Still another object of the invention is to arrange the openings between the two chambers to impart to the air entering the combustion chamber such a direction of flow that the combustion chamber contents will be maintained in swirling motion during the combustion part of the cycle.

And still another object of the invention is to so arrange the parts that the combustion chamber walls including the piston head will be maintained at very high temperatures during operation.

And another object is to provide in the piston, means for maintaining its exposed head portion at a high temperature, while positively cooling its other portions.

Figure 3:
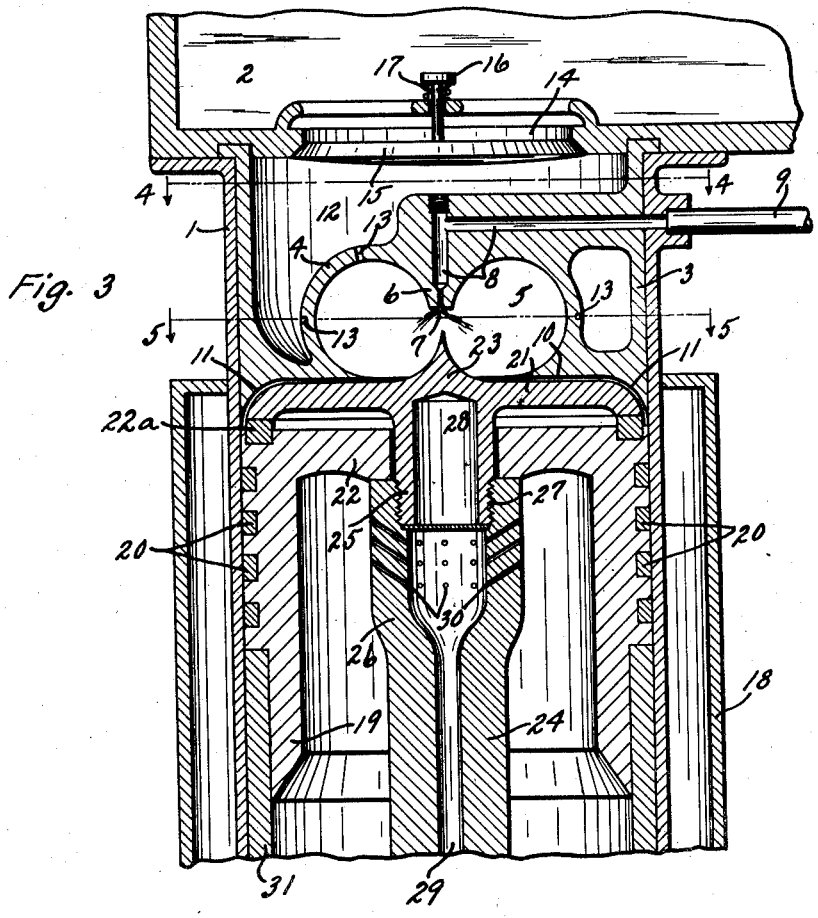
Figure 4:
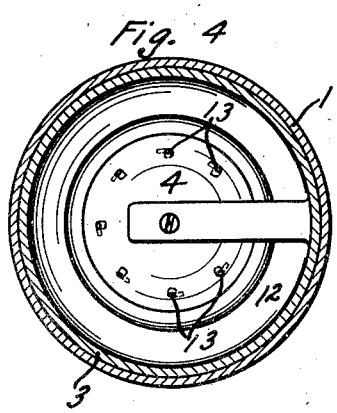
Figure 5:
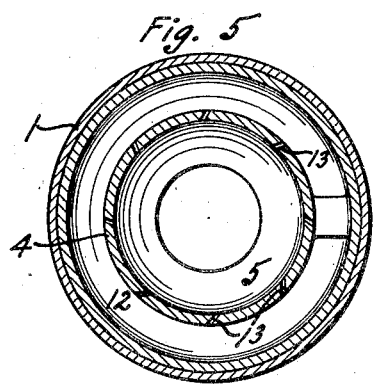

The exact nature of the invention together with further objects and advantages thereof will be apparent from the following description taken in connection with the accompanying drawings, in which Fig. 1 is a diagrammatic showing, largely conventional, of two cylinders of an engine embodying the principles of my invention; Fig. 2 is a section in the plane of line 2—2, Fig. 1, showing details of the distributor; Fig. 3 is an enlarged sectional detail of the head end portion of one of the engine cylinders; and Figs. 4 and 5 are sectional details as in the planes of lines 4—4 and 5—5, respectively, Fig. 3.

With reference now to the drawings the head end of each cylinder 1 of the engine terminates adjacent the container 2, and is there secured so that the opposite cylinder end is free for expansion. Within each cylinder adjacent the container is a head member 3. The head member 3 has a wall 4 providing a cavity 5 opening into the cylinder. The shape of the wall 4 is such that the cavity 5 is of the ring form indicated. More specifically the shape is substantially that which would be generated by a circle rotated about a tangent, the tangent being the center line of the cylinder 1. Thus the head member 3 has a projection 6 central of both the cylinder and the cavity 5. Set into this extension 6 is a nozzle 7 with leads 8 in the head member directed thereto and communicating with a pipe 9. About the mouth portion of the cavity 5, where the latter opens into the cylinder, the head member 3 is provided with a flat face 10 extending transversely of the cylinder and curved at its edge to provide a peripheral fillet 11. The wall 4 is so located in the member 3 as to provide a chamber 12 between the wall and the adjacent wall portion of the container 2. In the wall 4 are a plurality of through openings 13 providing communication between the chambers 12 and 5. Each of these openings 13 is so arranged as to direct flow therethrough into the chamber 5 in such a way as to produce a swirling in the chamber about the cylinder axis. Thus each opening 13 is similarly inclined from the corresponding radial to the center both of the cylinder and of the section, all as indicated in the drawings. In the wall of the container 2 is a port 14 leading to the chamber 12 and controlled by an automatic valve 15 arranged to allow flow through the port in one direction only: from the container to the chamber 12. Thus the valve is provided with a stem 16 and the usual spring 17 for the purpose.

Each cylinder is provided with the usual water jacket 18. Within each cylinder is a piston 19 having the usual rings 20. In the example shown the piston has a head portion 21 spaced from an underlying head portion 22 by a non-metallic and therefore heat insulating ring 22a so that the exposed head portion 21 will attain a high temperature when the engine is in operation. This head portion 21 has a central extension 23 opposite the corresponding extension portion 6 of the head member 3, so that the chamber 5 when the piston is at its head end position as indicated in Fig. 3, will have approximately the form of a doughnut. The piston head 21 is secured with a piston rod 24 as by threading the stem portion 25 of the former into the enlarged end 26 of the piston rod, as at 27. Thus the parts are secured in assembled relation, the piston 19 being clamped as indicated. It will be noticed that the bearing of the piston head portion 21 upon the ring 22a, together with that of the rod 24 upon the piston portion 22 are of such nature as to allow lateral shifting of the parts, and the clearance in the piston portion 22 about the stem 25 is sufficient to such end. By this arrangement thermal expansion of the parts is accommodated, and even some misalignment of the parts provided for. The stem 25 is preferably hollow as at 28 to prevent burning of the extension 23. The piston rod 24 is drilled as at 29 for a cooling medium and its enlarged portion 26 is provided with openings 30 through which liquid delivered through the connecting rod may escape and strike the inner surface of the piston, for cooling the latter. In the example shown, a skirt 31 extends from the piston as does the piston rod 24, as the engine is provided with opposed pistons upon a common rod from which power is taken by a cross head. Leading laterally from the cylinder 1 is an exhaust outlet 32 located just above the piston when the latter is at the outer end of its stroke as indicated in the right-hand cylinder of Fig. 1.

With reference now to the showing of Fig. 1, the fuel supply system to the various cylinders of the engine includes pump means 33, a receiver 34 and a distributor 35. The pump means shown includes a cylinder 36 with a piston 37 suitably associated with the crank shaft or other part of the engine to be driven thereby. The pump shown is double acting, the cylinder 36 receiving fuel from a supply tank 38 at either end through piping 39 and the pump delivering to the receiver 34 through piping 40 and 40a. The receiver 34 has associated therewith a valve 41 controlling a port 42 and for the purpose adjustable thereagainst by a nut 43 upon the threaded stem 44 of the valve, working against a spring 45. The arrangement is such that by adjustment of the nut 43 a controlled amount of the fuel delivered by the pump 33 may overflow from the receiver 34 through the overflow pipe 46 and back into the tank 38; so that the pressure in the receiver may be controlled independent of the operation of the pump. Leading from the receiver is a pipe 47 which has delivery connection with an axial lead 48 in the distributor rotor 49. This rotor is turned in a housing 50 by means of a shaft 51 having positive driven connection from the engine as from the crank shaft thereof. Upon the circumferential face of the rotor 49 are a number of grooves 52 each elongated circumferentially as indicated, each of greatest depth at its leading end with depth decreasing toward its following end, as shown Fig. 1, and each having its sides converging at its forward end as at 53. Each groove 52 has connection with the lead 48 as by a radial lead 54. Leading from the rotor housing 50 are a number of pipes 9. Each pipe 9 has connection with the casing in the plane of one of the grooves 52, and leads thence to the injection valve 7 of one of the cylinders of the engine. In the example shown a distributor has four grooves 52, and eight pipes 9 lead from the distributor casing, as the engine contemplated has four double acting cylinders which operate in pairs.

The rotor 49 moves clockwise Fig. 1, and of course at crank shaft speed. It will be apparent that when the engine is operating, the pump 33 and the distributor will cause liquid fuel at high pressure to be delivered to the several injection valves of the engine, the rotor being so timed that the leading end of one of the grooves 52 will move under the inlet end of one of the pipes 9, as or slightly before the piston of the corresponding cylinder is at the head end of its stroke. The amount of fuel delivered will depend upon the setting of the nut 43, or in other words, upon the pressure within the receiver 34. Also as the distributor rotor advances the amount will be decreased owing to the decreasing dimensions of the groove 52. These grooves are of such length that injection will terminate just before the exhaust port is uncovered by the piston.

In operation the container 2 is a receiver in which compressed air is maintained by suitable compressor pump means not shown.

Thus when any piston is sufficiently advanced in its power stroke to uncover the exhaust port of its cylinder, as shown in the right-hand cylinder, Fig. 1, the products of combustion may escape through the exhaust pipe 32 decreasing pressure within the cylinder, whereupon the pressure in the receiver 2 will unseat the valve 15, and the products of combustion will be displaced in the cylinder by fresh air. Inflow of air from the receiver is through the storage chamber 12, the openings 13 and the combustion chamber 5. The valve 15 is maintained cool by the air flowing therepast.

Return stroke of the piston then recovers the exhaust port, the valve 15 reseats under the action of its spring 17 and the trapped air is compressed, some thereof returning into the chamber 12 by way of the openings 13. As the piston reaches the head end of its stroke as indicated left-hand cylinder, Fig. 1, the adjacent flat faces of the cylinder head member 3 and the piston head cause a final inrush of air radially inwardly against the projection 23 of the piston. This sets up a swirl in the combustion chamber, this swirl in any plane passing through the axis of the cylinder, moving generally in opposite directions in the two circles defined by the wall 4 of the section. At such instant the distributor allows fuel to be fed at high pressure to the injection nozzle 7. This nozzle is preferably arranged to throw a cone-shaped jet as indicated Fig. 3, so that liquid fuel will not impinge upon the piston projection 23. The fuel burns instantly in the highly compressed air in the combustion chamber 5, the expansion of combustion moving the piston outwardly. As the piston moves pressure in the combustion chamber 5 is lowered so that air enters thereinto from the storage chamber 12 through the openings 13, replacing the products of combustion in the combustion cavity with fresh air, the discharge continuing from the nozzle 7. This new air is in turn consumed and replaced by still further air from the precombustion chamber and such process is continued until injection is cut off and the exhaust port again uncovered by the piston. All air entering the combustion chamber during combustion is given a swirling motion by the directions of the openings 13 so that the contents of the combustion chamber are always highly turbulent. It is important to note that both fuel and the air for its combustion are fed into the combustion chamber during a large part of the working stroke.

The exposed member 21 of the piston head being spaced from the underlying piston portion 22, will attain high temperatures in operation. So also will the wall 4 of the head member 3. By such means the air for combustion is highly preheated before combustion actually takes place.

What I claim is:

In an internal combustion engine, the combination of a cylinder, a reciprocating piston therein, a cylinder head having an external cavity forming an air storage chamber and a concentric interior substantially annular cavity cooperating with said piston at the end of the compression stroke thereof to form a substantially torus-shaped combustion chamber, a partition wall separating said chambers, said wall having a plurality of inclined passages establishing continuous restricted communication between said chambers, means for injecting fuel into said combustion chamber centrally thereof, means for supplying air to said air storage chamber, said passages being inclined to impart a whirling motion to the air entering said combustion chamber therethrough.

DAVID J. DOLAN.